US011238484B2

(12) United States Patent
Chakrobartty et al.

(10) Patent No.: US 11,238,484 B2
(45) Date of Patent: Feb. 1, 2022

(54) SYSTEMS AND METHODS FOR PROMOTIONAL PROGRAMS

(71) Applicant: Walmart Apollo, LLC, Bentonville, AR (US)

(72) Inventors: Shuvro Chakrobartty, Bentonville, AR (US); Jay Nair, Cumming, GA (US); Sandya Pankajakshan Nair, Bentonville, AR (US); Sara Meyer, Cave Springs, AR (US); Alex Hurd, Bentonville, AR (US); Marina Hodges, Springdale, AR (US); Ted Sherrill, Rogers, AR (US); Saul Solis, Bentonville, AR (US); Hanumantha Mandava, Bentonville, AR (US); Gopi Kishore Danda, Bentonville, AR (US); Chris Venable, Bentonville, AR (US); Samuel Hunter, Centerton, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 17/131,085

(22) Filed: Dec. 22, 2020

(65) Prior Publication Data
US 2021/0182898 A1   Jun. 17, 2021

Related U.S. Application Data

(63) Continuation of application No. 15/507,157, filed as application No. PCT/US2015/047111 on Aug. 27, 2015, now Pat. No. 10,902,454.

(60) Provisional application No. 62/042,635, filed on Aug. 27, 2014.

(51) Int. Cl.
G06Q 30/00 (2012.01)
G06Q 30/02 (2012.01)
G06Q 20/20 (2012.01)

(52) U.S. Cl.
CPC ......... *G06Q 30/0238* (2013.01); *G06Q 20/20* (2013.01); *G06Q 30/02* (2013.01)

(58) Field of Classification Search
None
See application file for complete search history.

(56) References Cited

U.S. PATENT DOCUMENTS

| 6,129,274 | A | 10/2000 | Suzuki |
| 6,332,126 | B1 | 12/2001 | Peirce |
| 6,408,286 | B1 | 6/2002 | Heiden |
| 8,015,060 | B2 | 9/2011 | Redford |

(Continued)

FOREIGN PATENT DOCUMENTS

EP    0867008    9/1998

OTHER PUBLICATIONS

International Preliminary Report on Patentability for International Application No. PCT/US2015/047111 dated Feb. 28, 2017.

(Continued)

*Primary Examiner* — Alvin L Brown

(74) *Attorney, Agent, or Firm* — Fitch, Even, Tabin & Flannery LLP

(57) ABSTRACT

Exemplary embodiments are directed to managing promotional programs. A promotion card is associated with at least one promotional program. Eligibility of one or more items is determined based on rules associated with the promotional program. A payment amount is calculated based on the eligibility of the items and the rules of the promotional program.

27 Claims, 8 Drawing Sheets

(56) References Cited

U.S. PATENT DOCUMENTS

| | | |
|---|---|---|
| 10,902,454 B2 | 1/2021 | Chakrobartty |
| 2006/0289636 A1 | 12/2006 | Hoblit |
| 2007/0143177 A1 | 6/2007 | Graves |
| 2007/0282679 A1 | 12/2007 | Gable |
| 2009/0037275 A1 | 2/2009 | Pollio |
| 2013/0079117 A1 | 3/2013 | Maskatia et al. |
| 2013/0103484 A1 | 4/2013 | McLaughlin |
| 2013/0218673 A1 | 8/2013 | Levine |
| 2015/0112789 A1 | 4/2015 | Yadati |
| 2015/0332311 A1 | 11/2015 | Patel |
| 2017/0286991 A1 | 10/2017 | Chakrobartty |
| 2018/0315066 A1 | 11/2018 | Heitmueller |

OTHER PUBLICATIONS

International Search Report and Written Opinion for International Application No. PCT/US2015/047111, dated Dec. 1, 2015.
SAS Institute Inc., "Using Analytical Marketing Optimization to Achieve Exceptional Results," 2013.
USPTO; U.S. Appl. No. 15/507,157; Office Action dated Jan. 10, 2019; (pp. 1-17).
USPTO; U.S. Appl. No. 15/507,157; Office Action dated Apr. 30, 2019; (pp. 1-16).
USPTO; U.S. Appl. No. 15/507,157; Office Action dated Dec. 11, 2019; (pp. 1-16).
USPTO; U.S. Appl. No. 15/507,157; Office Action dated Apr. 15, 2020; (pp. 1-17).
USPTO; U.S. Appl. No. 15/507,157; Notice of Allowance dated Sep. 2, 2020; (pp. 1-10).

SYSTEMS AND METHODS FOR PROMOTIONAL PROGRAMS

RELATED PATENT APPLICATIONS

This application is a continuation of U.S. patent application Ser. No. 15/507,157, filed on Feb. 27, 2017, which is a 35 U.S.C. § 371 National Stage filing of International Application PCT/2015/047111, filed on Aug. 27, 2015, which claims priority to U.S. Provisional Patent Application No. 62/042,635, filed on Aug. 27, 2014. The contents of each application are hereby incorporated by reference in their entirety.

BACKGROUND

Many entities, such as retailers and manufacturers, provide discounts to customers for purchasing certain products. These discounts are offered in various forms. Retailers and manufacturers can also require a customer to satisfy certain criteria for receiving the discount. Various systems and devices are used to keep tract of the criteria and discounts available. Paper coupons do not provide dynamic means to manage and edit criteria for the associated discount. Paper coupons also do not allow for multiple offers for one coupon. Similarly, existing card-based discount programs do not provide for dynamic means to manage and edit the discount program. It is also difficult for customers to redeem multiple offers or multiple different coupons for an item or multiple items. Many times, the cashier needs to determine which offers are applicable, and which order the offers should be applied. The cashiers may also need to calculate the discount and final payment amount themselves.

SUMMARY

Exemplary embodiments of the present disclosure are directed to creating, managing, and executing a promotional program in a computing environment.

In one embodiment, a system for managing promotional programs is provided. The system includes a point-of-sale (POS) device programmed to receive a promotional card as an input in a transaction to purchase one or more items. The POS device determines whether the promotional card is associated with a promotional program. The system further includes a server executing a substantiation platform programmed to communicate with the POS device to receive information relating to the promotional program and one or more items scanned at the POS device as part of the transaction. The substantiation platform comprises a rule engine that receives information relating to the one or more items and one or more rules associated with the promotional program, and analyzes the one or more rules to determine eligibility of the one or more items for the promotional program. The rule engine also outputs payment information for the one or more items based on eligibility and the rules associated with the promotional program. The substantiation platform determines payment information for the one or more items determined to be eligible for the promotional program, and the substantiation platform is programmed to transmit, to the POS device, the payment information. The POS device is programmed to process the payment information to adjust a payment amount of the items based on the payment information and to accept tender for the payment amount.

In another embodiment, a method for managing promotional programs is provided. The method includes executing code by a point-of-sale (POS) device programmed to receive a card number associated with a promotional card from a customer via an interface of the POS device, and to identify the card number as corresponding to at least one promotional program, receiving information related to one or more scanned items from the POS device in response acceptance of the promotion card by a server executing a substantiation platform, determining, by execution of a rules engine of the substantiation platform, eligibility of the one or more items for the promotional program based on one or more rules associated with the promotional program, determining, in response to execution of the rules engine, a payment amount for the one or more items based on the eligibility of the one or more items and the one or more rules for the promotional program, outputting the payment amount from the substantiation platform to the POS device, and executing code by the POS device to control completion of a transaction based on the payment amount of the items and to accept tender for the payment amount.

In another embodiment, a non-transitory computer readable medium storing instructions executable by a processing device, wherein execution of the instructions causes the processing device to implement a method for managing promotional programs is provided. The instructions include executing code by a point-of-sale (POS) device programmed to receive a card number associated with promotional card from a customer via an interface of the POS device, and to identify the card number as corresponding to at least one promotional program, receiving information related to one or more scanned items from the POS device in response acceptance of the promotion card by a server executing a substantiation platform, determining, by execution of a rules engine of the substantiation platform, eligibility of the one or more items for the promotional program based on one or more rules associated with the promotional program, determining, in response to execution of the rules engine, a payment amount for the one or more items based on the eligibility of the one or more items and the one or more rules for the promotional program, outputting the payment amount from the substantiation platform to the POS device, and executing code by the POS device to control completion of a transaction based on the payment amount of the items and to accept tender for the payment amount.

Any combination and/or permutations of embodiments is envisioned. Other objects and features will become apparent from the following detailed description considered in conjunction with the accompanying drawings. It is to be understood, however, that the drawings are designed as an illustration only and not as a definition of the limits of the invention.

BRIEF DESCRIPTION OF DRAWINGS

Some embodiments are illustrated by way of example in the accompanying drawings and should not be considered as a limitation of the invention.

DESCRIPTION OF EXEMPLARY EMBODIMENTS

Figure 1:
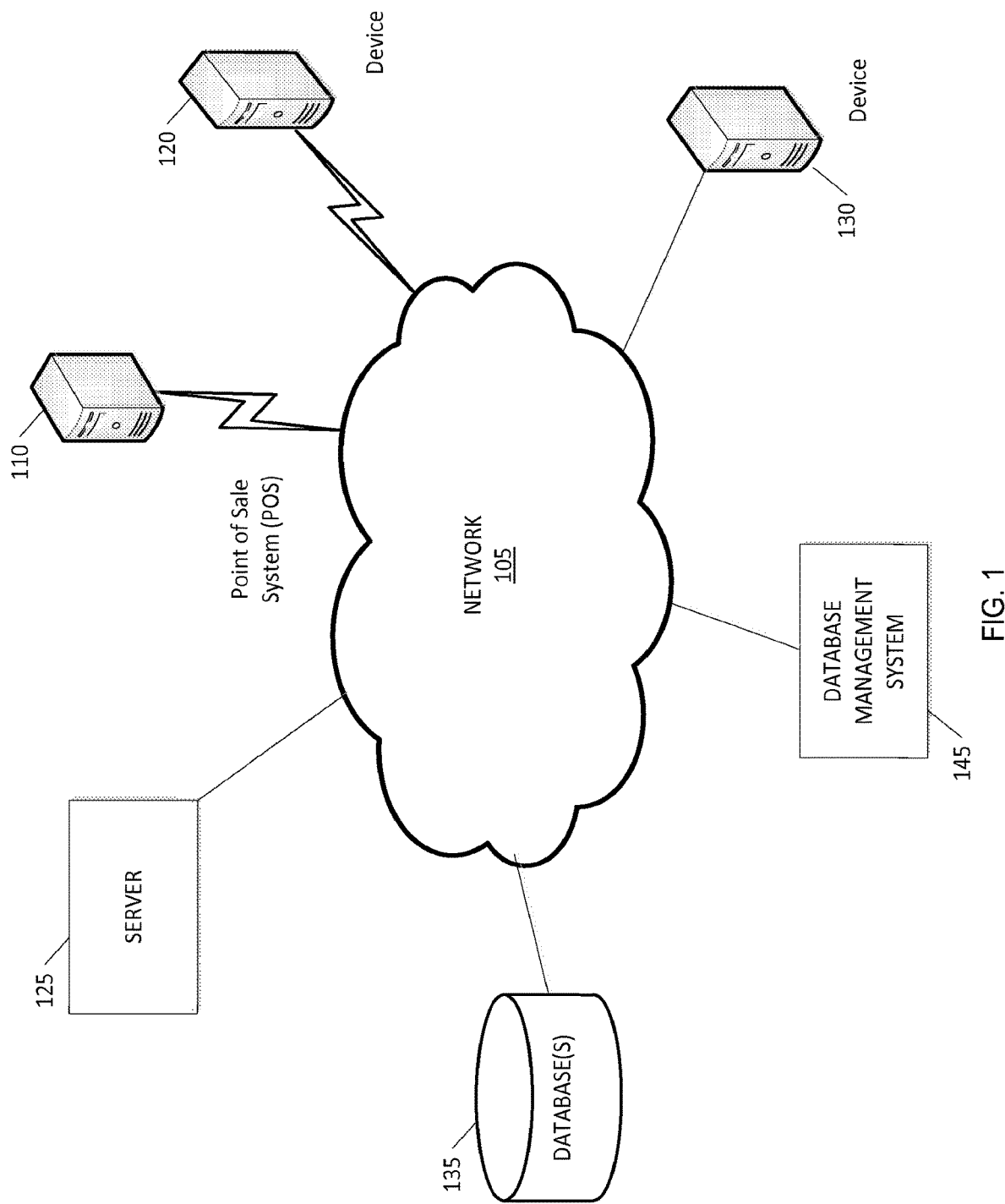
FIG. 1 illustrates a network diagram depicting a system for orchestrating promotional programs, according to an example embodiment.

Described in detail herein are systems and methods for promotional programs. Many entities provide promotional offers for purchasing their products, or for purchasing products in their stores. The systems and methods described herein enable creation of promotional programs based on specified criteria and rules, and make the promotional program available to a customer via a promotional card (e.g., a gift card having a magnetic stripe encoded with a card number). The systems and methods relate to a substantiation platform that enables a business-entity user to create and manage a promotional program through a substantiation program defined in the substantiation platform. The business-entity user can define various rules and criteria for the promotional program and load it on a specific promotional card. The rules and criteria can define eligible items, discount percentage, amount of cash available (like a gift card), location-specific eligibility, and the like.

The card issuing entity may use a specific range of card numbers to keep track of valid promotional cards. The promotional card can be used in a retail store while purchasing items. The retail store can issue the promotional card with offers related to products purchased from its store. Alternatively, the promotional card can also be issued by a third-party vendor for use in the retail store. For example, a customer may be purchase items at WalMart, and use a promotional card issued by Apple® to redeem an offer for an Apple® product. In this case, Apple® would work with WalMart to set up the promotional program via the substantiation platform, so that the POS terminals at WalMart identify the card as a valid promotional card. As another example, a customer may have a promotional card issued by WalMart, where the customer receives a 10% discount on avocados from the healthy fresh produce category.

A customer shops for merchandise at a store, and follows a checkout process where a cashier, or in case of a self-checkout the customer, scans all the items he or she wants to purchase at a Point-of-Sale (POS) terminal. After the items are scanned, a total payment amount is calculated. The customer can swipe a promotional card at this time. The POS terminal receives the card number from the promotional card in response to the swipe and recognizes the card number included on or embedded in the promotional card, and applies the criteria and rules associated with the promotional program associated with the card. An updated payment total is presented to the customer, and if necessary, additional tender is requested by the POS terminal. After payment is authorized, a receipt is printed indicating which items were eligible under the promotional card, the total discount applied, and/or the total gift card funds tendered.

Promotional programs can be realized via substantiation platform. The substantiation platform allows for implementation of various offers based on location and other criteria. The offers implemented through the substantiation platform are governed by substantiation programs. The substantiation programs can be offered by the retail store where the customer is purchasing or by a third-party entity. In case of a third-party entity, the selling retail store may work with them to understand their promotional program, and setup the program in the substantiation platform by implementing appropriate rules for the substantiation program(s).

The substantiation platform allows for a discount for an item or group of items, a certain amount of money off of specific item(s) or the entire purchase, and location-based offers where a dynamic implementation of offers can be based on a specific geographic region, a specific store, and/or a group of stores. The substantiation program may compose of criteria relating to a specific class of items or groups of different class of items from different categories. For example, buy one get one free or buy a bundle of items for a certain discount on all or specific item(s). Some other examples of substantiation programs include allowing multiple offers (through different programs) on item(s) of same or different categories, and allowing different offers from one card or different cards.

A customer who is participating in a promotional program would have a card that he or she can swipe when purchasing items at a retail store's Point-of-Sale (POS) system. The cards can be categorized in three categories, for example, a discount only card where a certain discount on item(s) is provided based on the substantiation program associated with the card, a payment/tender only card where a certain amount can be tendered for an item(s) based on the substantiation program associated with the card, and a combination of a discount and payment/tender card. Based on the promotional card's payment network, the promotional card can either be an 'open-loop' or a 'closed-loop' card. An open-loop card is a card whose payment network allows it to be used or redeemed anywhere. For example, if the promotional card belongs to the Visa payment network, it can be used anywhere Visa is accepted (e.g., any stores, via telephone, or online). A closed-loop card can only be used or redeemed at a specific merchant that the card belongs to. For example, a card from a specific retailer, such as WalMart, can only be used at WalMart stores (physical stores and/or online store).

Promotional cards can be associated with discounts, tender money, direct spend, or a combination of discount and tender. The cards can be designated for exclusive use in a particular retail store or multiple groups of retail stores, such as WalMart or Sam's Club. The card may be either issued by the retail store where the customer is purchasing the items (and also the store that maintain the substantiation platform), or any other third-party entity. In case of a third-party card and program, the discount or tender amount may settled by the retail store through a periodic reconciliation process.

A substantiation program set up by the offer providing entity defines certain rules applicable to certain item(s) of certain categories. The substantiation program enables providing discount on item(s), and payment for a portion or full price of an item or the entire purchase transaction. The offer providing entity can enable a card for multiple promotional programs, in which case the substantiation platform determines the precedence of the offers and the actual discount and tender decisions for the item(s) based on the rules built into the substantiation program.

When a program is setup, promotional cards can be mapped to one or more promotional programs. One card may have multiple programs associated to it. Each substantiation program can have eligible item(s) for participating in the promotional program and/or non-eligible items for participating in the promotional program. A combination of item groups as a unit for participating in the program may be, for example, buy one get one free of the same item, or get a discount of a related item such as purchase a printer and get an ink-cartridge free or half-off.

Each of the substantiation program can be setup to be applicable within a specific geographic location based on a location hierarchy such as Country>State>City or Country>County>City. Based on the business requirement the substantiation programs are set up to be effective for a particular location, for example, a 10% discount for apples purchased in any stores in the United States, or for apples only purchased in a particular store in Bentonville, Ark., USA. Below is an example rule table based on location specific promotional programs.

| Country | State | City | Store Number | Applicable Program | Apply Discount (%) |
|---|---|---|---|---|---|
| US | Null | null | | POS Healthy Food Discount | 5 |
| | | | | POS Smoking Cessation Program | 10 |
| | | | | POS Breast Pump Program | 15 |
| | AR | | | POS Exercise Equipment Program | 15 |
| | | | | POS Healthy Food Discount | 10 |
| | | Bentonville | | POS Healthy Food Discount | 20 |
| | | | 2203 | POS Healthy Food Discount | 30 |

FIG. 1 illustrates a network diagram depicting a promotional program system 100 for implementing a promotional program via a substantiation platform, and providing the benefits of the promotional program to users, according to an example embodiment. The system 100 can include a network 105, multiple devices, for example, Point-of-Sale (POS) system 110, device 120, device 130, a database 135, a server 125, and a database management system 145. Each of the devices 110, 120, 130, database(s) 135, one or more servers 125, and database management system 145 is in communication with the network 105.

In an example embodiment, one or more portions of network 105 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The device 110 is a POS system that is part of a store infrastructure and aids in performing various transactions related to sales and other aspects of a store. Being part of a store's infrastructure, the POS system may be installed within the store or may be installed or operational outside of the store. For example, the POS system may be a mobile device (e.g., mobile phone, tablet, or custom hand-held device) that a store employee can use outside of the store to perform transactions or other activities. Additionally, the POS system may be a kiosk installed outside the store. Similarly, the POS system may be a mobile device that can be used within the store, and is not physically installed or attached to one particular location within the store.

The devices 110, 120, 130 may comprise, but are not limited to, cash registers, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, smartphones, tablets, netbooks, and the like. The device 110 being a POS system, may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like.

Each of devices 110, 120, 130 may connect to network 105 via a wired or wireless connection. Each of devices 110, 120, 130 may include one or more applications such as, but not limited to, a sales transaction application, an inventory application, a product search application, a promotional program application, a substantiation platform, and the like. In an example embodiment, the devices 110, 120, 130 may perform some or all of the functionalities described herein.

In some embodiments, the promotional program system may be included on the server 125, which performs the functionalities described herein. In yet another embodiment, the devices 110, 120, 130 may perform some of the functionalities, and one or more servers 125 perform the other functionalities described herein. For example, devices 110, 120, 130 may create and manage a virtual basket (e.g., information on items being purchased) and determine whether a promotional card is valid, while one or more servers 125 may determine whether the items in the basket are eligible for a promotional offer, and calculate the price of the items based on the rules of the promotional program.

Each of the database(s) 135, database management system 145, and one or more servers 125 is connected to the network 105 via a wired connection. Alternatively, one or more of the database(s) 135, database management system 145, and one or more servers 125 may be connected to the network 105 via a wireless connection. Although not shown, database management system 145 can be directly connected to databases 135, or server 125 can be directly connected to the database management system 145 and/or database(s) 135. Server 125 comprises one or more computers or processors configured to communicate with devices 110, 120, 130 via network 105. The one or more servers 125 host one or more applications or websites accessed by devices 110, 120, 130 and/or facilitates access to the content of database(s) 135. Database management system 145 comprises one or more computers or processors configured to facilitate access to the content of database(s) 135. Database(s) 135 comprise one or more storage devices for storing data and/or instructions (or code) for use by the one or more servers 125, database management system 145, and/or devices 110, 120, 130. Database(s) 135, one or more servers 125, and/or database management system 145 may be located at one or more geographically distributed locations from each other or from devices 110, 120, 130. Alternatively, database(s) 135 may be included within the one or more servers 125 or database management system 145. In some embodiments, a rule management system for the substantiation platform may be implemented in the database management system 145 and the database(s) 135.

A rule repository as part of the substantiation platform may also be implemented in the database(s) 135.

Figure 2:
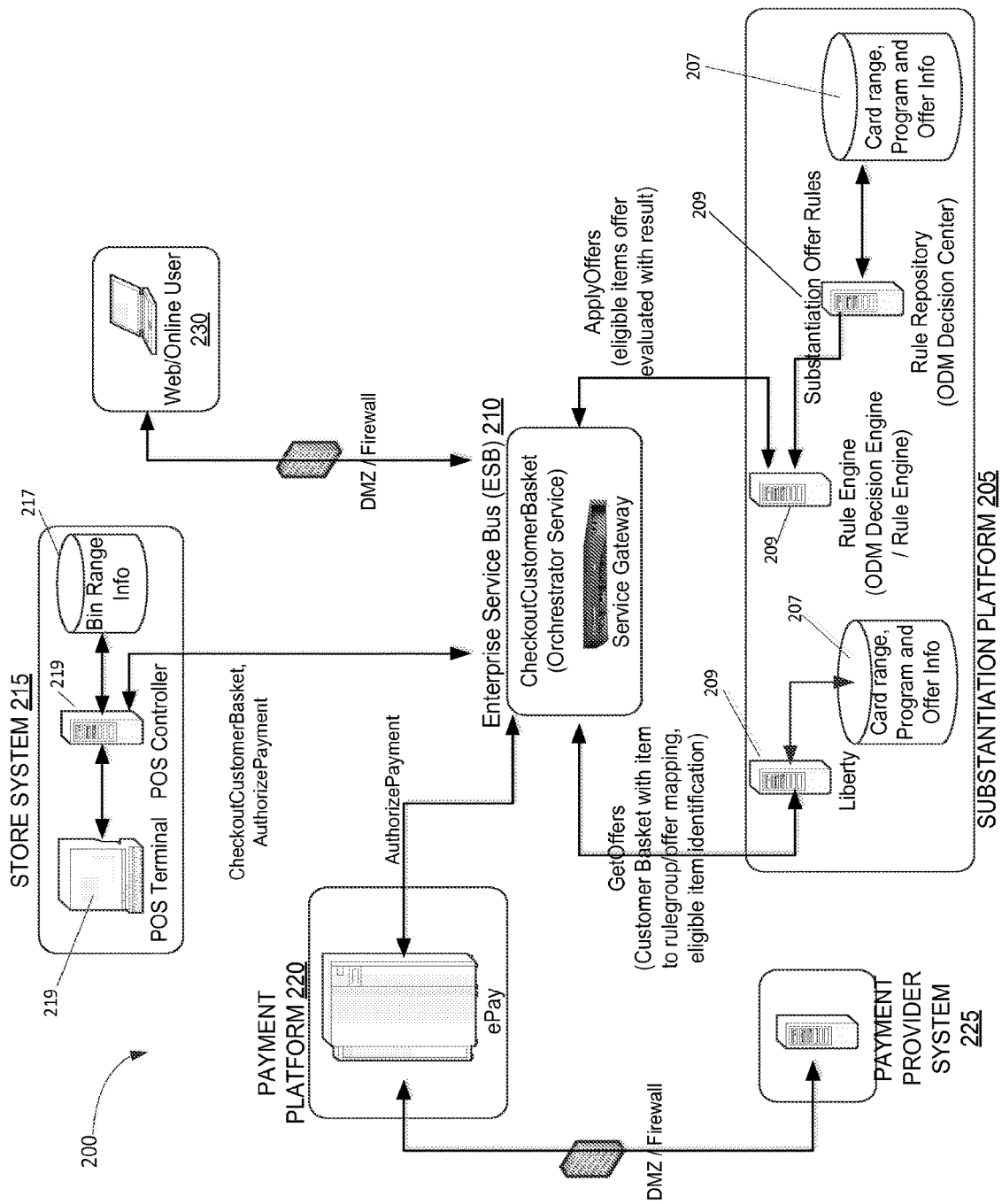
FIG. 2 illustrates a system for orchestrating promotional programs, according to an example embodiment.

FIG. 2 illustrates a system 200 for orchestrating promotional programs, according to an example embodiment. The system 200 includes substantiation platform 205, enterprise service bus (ESB) 210, store system 215, payment platform 220, payment provider system 225, each of which can correspond to, be executed by, and/or be accessed using computing devices, such as devices 110, 120, and 130, or the one or more servers 125. In the example embodiment shown in FIG. 2, user 230 can interact with the system 200 via the ESB 210. The substantiation platform 205 may include databases 207 for information relating to card numbers and promotional programs, and systems 209 such as a rule repository, a rule engine, and a service system. The rule repository, which may also be referred to herein as an Operational Decision Manager (ODM) decision center, may be responsible for storing and managing rules and criteria relating to one or more promotional programs, such as rules regarding location, eligible items, ineligible items, discount percentage, tender amount, and the like. The rule engine, which may also be referred to herein as an ODM decision engine, may be responsible for processing the rules and criteria to determine eligibility of items under the promotional program. The service system may be responsible for managing the promotional programs or substantiation programs. The service system (i.e., "Liberty" service), maintains the lifecycle of the promotional programs, and allows integration of the promotional programs data with the ODM decision center. The service system allows a business user to set up new promotional programs and edit existing promotional programs (for example by changing or adding items to the approved item list or blacklist) Once the promotional program is set up in the service system, the data is integrated with the ODM decision center so that rules can be authored and/or programmed for the substantiation program corresponding to the promotional program.

The ESB 210 may include a service gateway 212 that allows for interfacing and communications between the components of the system 200, and can implement an orchestrator service. The store system 215 may include database(s) 217 for information relating to card number information, and POS systems 219, such as the POS terminal and POS controller. A customer can purchase one or more items and tender payment for the items via the POS terminal. The POS terminal can be programmed to accept (e.g., by swiping or scanning) a promotional program card from customers to allow customers to redeem one or more offers during checkout.

The payment platform 220 may be responsible for managing and processing payments tendered by a customer for one or more items. The payment provider system 225 may be a payment provider (financial institution) corresponding to a promotional card and/or payment card used by the customer during the checkout process, and may be responsible for settling accounts with the retail store for the payments tendered by the customer. For example, if the customer used his or her credit card to pay for items, the payment provider system 225 would correspond to the credit card entity. In addition to purchasing items in a physical store, a customer 230 can also purchase items online via the store's website. In that case, the customer 230 would enter the card number from his or her promotional card online during the checkout process (instead of swiping or scanning it at a POS terminal) to redeem one or more offers. In some embodiments, the online user may have the option to save his or her card information in an online account/profile for the store's website.

In the system 200, the substantiation platform 205 includes the rules associated with various card numbers. When a customer (or cashier) swipes his or her card at a POS terminal, the store system 215 receives the card number associated with the promotional card at a POS terminal of the store system 215 and communicates to ESB 210 information relating to the item(s) to be purchased and payment to be tendered, including any promotional card number(s) that have been received. The ESB 210 communicates this information to the substantiation platform 205. The substantiation platform 205 analyzes the information to determine any item or items that are eligible (or ineligible) for any promotional offers associated with the promotion card. The substantiation platform 205 then communicates the offer(s) and eligible (or ineligible) item(s) to the ESB 210. The ESB 210 communicates the final payment amount to the payment platform 220, and requests authorization for the payment. The payment platform 220 communicates to the payment provider system 225 to receive payment. Once payment is authorized, the ESB 210 communicates authorization to store system 215, which allows the customer to tender payment for items. For security measures, communications outside the enterprise may pass through a firewall. For example, communications with an online customer 230 and payment provider system 225 go through a firewall.

Some of the features of the substantiation platform includes enabling location specific offers, that is a dynamic implementation of offers based on location (e.g., a specific geographic region, a specific store, or a group of stores), enabling providing discount for item(s), and enabling providing certain money off of specific item(s) or on the entire purchase. The substantiation platform enables promotional programs to be composed of location criteria as well as item criteria (e.g., a specific class of items from a category, or groups of different class of items from different categories). For example, the promotional program may include a buy one get one free offer, or an offer for a discount on an item or the group of items when a customer buys a bundle of items. The substantiation platform also allows a customer to redeem multiple offers from different promotional programs on items of same or different categories. The multiple promotional programs can be redeemed by using (e.g., swiping or scanning) one promotional card or by using multiple promotional cards. The substantiation platform further allows for promotional programs from different vendors to be applied to the transaction. For example, a customer can redeem a promotional offer from the retailer of the item, and from the manufacturer of the item.

Figure 3:
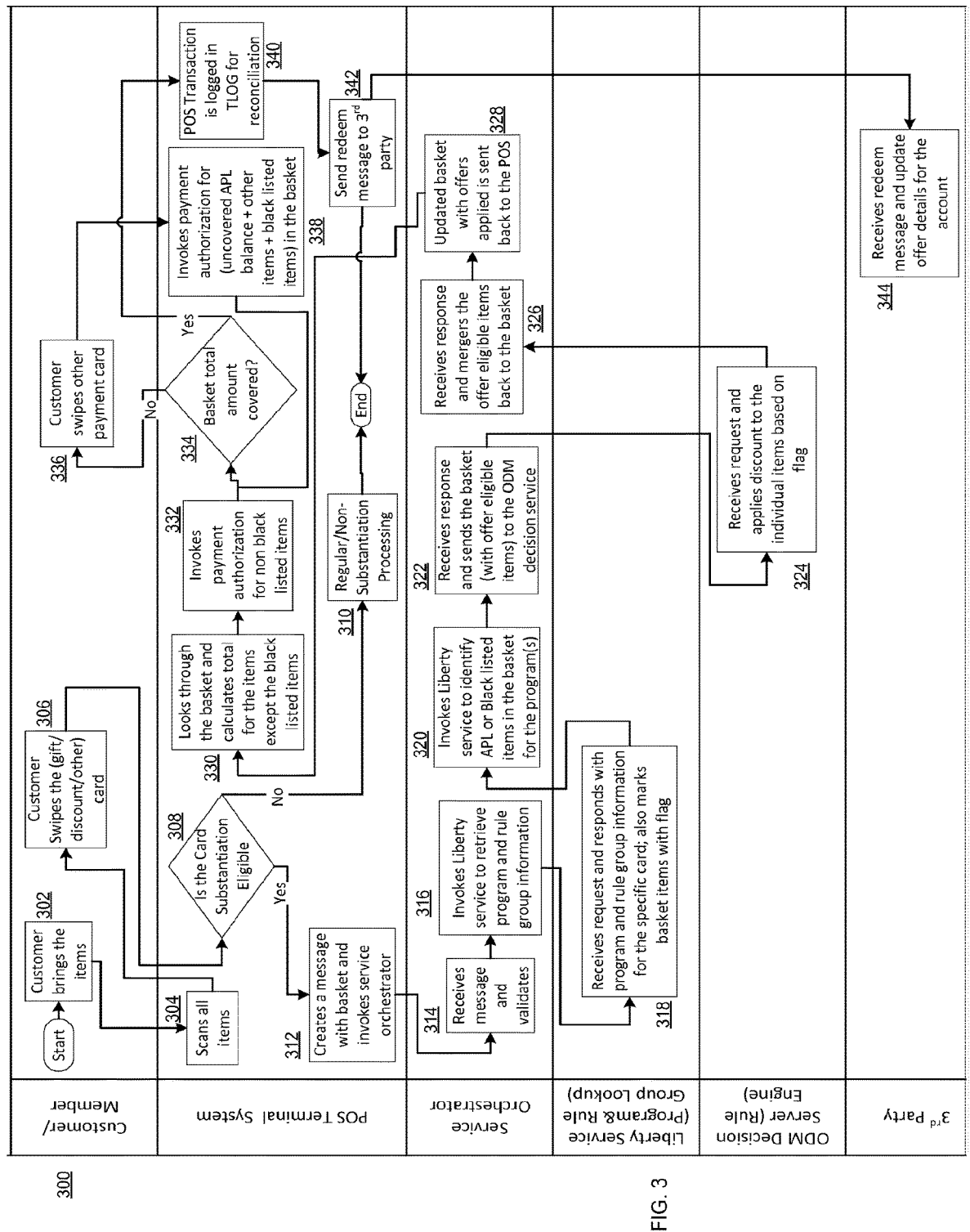
FIG. 3 is a flowchart for a sale process incorporating promotional programs, according to an example embodiment.

FIG. 3 is a flowchart for a sale process 300 incorporating promotional programs, according to an example embodiment. The process 300 starts at block 302 with the customer bringing one or more items to the POS terminal for checkout. At block 304, the item(s) are scanned at the POS terminal, after which the customer or cashier swipes or scans one or more promotional cards and/or payment cards at block 306 (e.g., the POS terminal receives inputs as associated with one or more cards). In the example embodiment shown in FIG. 3, the promotional card can be a payment/tender only card. A customer can use the payment/tender only card to pay for only those items that are identified as being eligible via the substantiation program or conversely the customer cannot use the promotional card as tender for ineligible items. When a customer wishes to purchase both eligible and ineligible items, the customer can be required to use another card as tender for the ineligible items. In an example embodiment, when a promotional card is swiped and is associated with a third-party, the card number is encrypted and is communicated to a third-party server for verification. The third-party server receives the encrypted card number, decrypts the card number, and generates a unique token representative of the card number. The third-party server encrypts the token and communicates it to the POS terminal system. During the same transaction, the POS terminal now uses the token, instead of the card number, to communicate and transmit information to the third-party server regarding the transaction.

The scanned items are placed in a virtual basket (e.g., a data-structure including information about the items scanned) for checkout. The POS terminal determines whether the promotional card is eligible for a substantiation program at block 308. In other words, the POS terminal determines whether the swiped card is associated with a card number that is within the range of promotional card numbers issued or accepted by the store. If the card is not eligible, then at block 310 the POS terminal continues with a normal sale transaction process without orchestrating a promotional program or substantiation program. If the card is eligible, then at block 312 the POS terminal creates and sends a message containing information about the scanned items, and invokes the service orchestrator for the substantiation program.

At block 314, the service orchestrator validates the received message, and invokes the retrieval system (known as Liberty service in an example embodiment) at block 316, and sends a request to retrieve substantiation program and promotional rule information. At block 318, Liberty service receives the request, and responds with substantiation program and rule information for the swiped card(s). The Liberty service also marks the one or more scanned items with a flag, if appropriate. For example, if a scanned item is not eligible for a promotional offer associated with the swiped card, then the Liberty service marks it a flag indicating the item's ineligibility for the offer. As another example, the Liberty services marks an item with a flag to indicate its eligibility for an offer. At block 320, the service orchestrator invokes Liberty service to identify items on the approved-product-list (APL) or blacklist from the scanned items. The APL can be specified by a business user when setting up the promotional program. Items on the APL are items that are eligible for a promotional program. If a scanned item is not on the APL, then it is ineligible to receive the offer defined in the promotional program. Items on the blacklist are items that are specifically identified as being ineligible for a promotional program. The lists can include no items, based on the promotional program. The lists can also include a hierarchy for the items.

In some embodiments, the items associated with the APL or blacklist can be location specific, such that depending on where a customer uses the promotional card, items may be eligible or ineligible (e.g., cameras may be on the APL in California, but on the blacklist in New York). At block 322, the service orchestrator receives a response, and sends the scanned items and rules associated with the card to the rule engine. At block 324, the rule engine applies the appropriate discounts to the items based on the flags associated with each item. At block 326, the service orchestrator receives a response from the rule engine, and merges the offer eligible items to the checkout basket. In some embodiments, the ineligible items are not further considered or analyzed by the substantiation platform. For example, at block 324, the rule engine ignores the items that are flagged as ineligible by the service system (i.e., "Liberty" service) at block 318.

At block 328, the basket is updated with applied offers, and communicated to the POS system. At block 330, the POS terminal processes the item(s) in the basket, and calculates the total of the items, except for the black-listed items. In some embodiments, a discount can also be applied to one or more of the items that are determined to be eligible to be paid for using the promotional card based on the substantiation program and rules associated therewith. At block 332, the POS terminal invokes payment authorization for non black-listed items. At block 334, the POS terminal determines whether the payment offered by the customer via the promotional card at block 306 is enough to cover the total amount due for the items in the basket. If it is not, then at block 336, the customer can swipe a payment card (e.g., a traditional credit/debit card) or use another method of payment (e.g., cash or check) and the process moves onto block 338. At block 338, the POS terminal invokes payment authorization for uncovered APL balance, black-listed items, and other items in the basket. Then again at block 334, the total balance covered is verified, and if the entire balance is covered the process moves to block 340. After payment authorization is determined, at block 340, the transaction is logged for reconciliation. At block 342, a redeem message is sent to the third-party server to communicate the transaction information and information related to the promotional program offered by the third-party redeemed by the customer. At block 344, the redeem message is received by the third-party server and the account information associated with the customer is updated to reflect redemption of the promotional program.

In example embodiments, the substantiation platform, via the service orchestrator and rule engine, is capable of processing multiple promotional offers for one item. For such processing, the substantiation platform may determine the order in which the offers are applied, or whether all offers can be applied to the same item, or whether an offer needs to be adjusted because there are multiple applicable offers for an item. For example, through the use of one card, a customer has multiple promotional programs available for the items in his or her basket, where the promotional offers are from the retailer (such as WalMart) and from third-party vendors. An example may be that on 'black Friday' a retailer offers $10 off on all iPads®, and Apple® is also offering 10% off on all iPads® sold by the retailer. The substantiation platform may apply the $10 off first, and then apply the 10% discount on the item. Alternatively, the substantiation platform may apply the 10% discount first, and then apply the $10 off. This determination of the order of the promotional program can be defined by the entity that is offering the promotional program.

Another example of the capability of substantiation platform includes a customer being able to use multiple cards for multiple offers. For example, a customer may have a promotional card issued by WalMart that provides 20% discount on apples, and another card issued by a health insurance company that provides a $1 off any items from the fresh product department. The substantiation platform, based on the criteria defined by the entity providing the promotional offer, determines whether both offers can be applied, and if so which one is applied first.

In another example embodiment, the substantiation platform may include a stacking variable for processing multiple promotional programs and multiple cards. A promotional card may include multiple promotional offers. In some example embodiments, multiple discounts can be applied to an item when available balance (current balance after previous discount is applied) is greater than 0 and if the stacking variable is set 'yes.'

Additionally, the stacking variable allows a third-party to restrict applying multiple discounts on an item. For example, a TV may be eligible for two discounts: (1) program discount 1 (or card 1) 50% discount, and (2) program 2 (card 2) $20 off. However, the stacking variable is set by the third-party such that the second discount cannot be used with other discounts. In this case, when the customer swipes a card with the two promotional programs or swipes two cards with each having one of the promotional programs, only one of the discounts is applied to the TV.

As another example, a customer's basket may have a TV. The customer may swipe a card with two promotional programs—program A offering $10 off TV and stacking variable set 'yes', and program B offering 50% off TV and stacking variable set 'no.' When the TV is scanned at the POS terminal, and the promotional card is swiped, the discount under program A is applied, however the discount under program B is not applied because it does not allow stacking.

As another example, a customer's basket may have a bag of apples, a bag of oranges, a block of cheese, and a container of butter. The customer may swipe card 1 with two programs—program A offering buy 1 bag of apples and get 1 block of cheese free, and program B offering buy 1 bag of apples get one container of butter free with stacking variable set to 'no.' The customer may also swipe card 2 with promotional program C offering buy 1 bag of apples and get 1 bag of oranges free. In this case, program A and program C are applied to the customer's basket, and program B is not applied because stacking is not allowed under program B.

As another example, multiple offers from the same card may not be applied to the same item. The customer's basket may include one container of milk, one container of butter, and one block of cheese. The customer may swipe one card with two programs—program A offering buy one container of milk and get one block of cheese free, and program B offering buy one container of milk and get one container of butter free. In this case, only program A is applied to the one container of milk because the same container of milk cannot be considered under program B.

Figure 4:
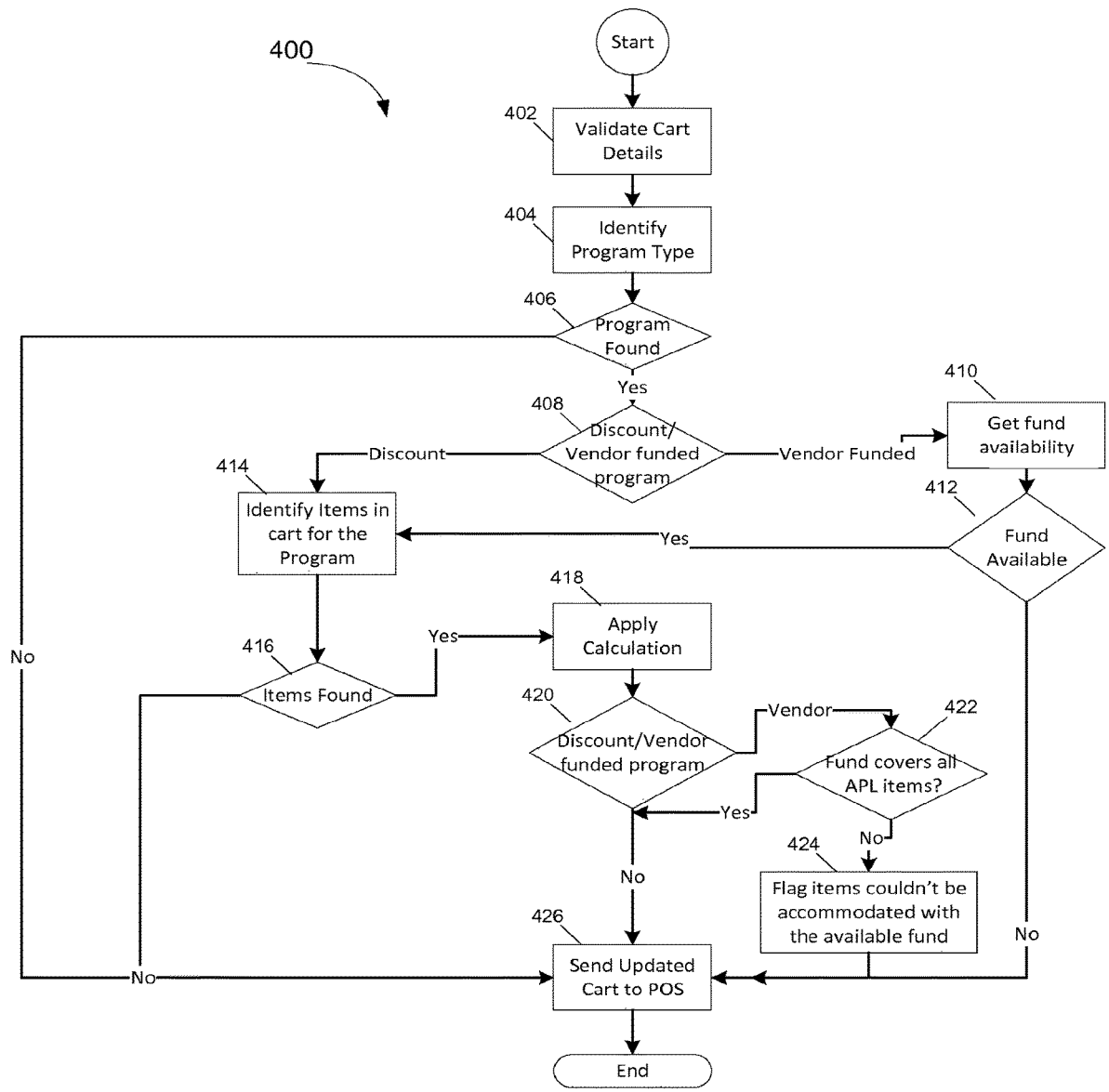
FIG. 4 is a flowchart for processing a promotional program, according to an example embodiment.

FIG. 4 is a flowchart for a method 400 for processing a promotional program, according to an example embodiment. Method 400 starts at block 402 by validating the basket/cart details. The virtual basket includes information related to items that a customer wants to purchase. At block 404, the promotional program type is identified. At block 406, if the promotional program is not found, i.e. the swiped card does not correspond to a promotional program issued or accepted by the retail store, then method 400 moves onto block 426. If the program is found at block 406, then method 400 determines whether the program is a discount promotion, a payment promotion, or a combination of that. If the promotional program is a payment promotion, then the availability of funds on the card is obtained at block 410. At block 412, it is determined whether funds are available. If funds are not available, then method 400 moves onto block 426. If funds are available, then method 400 continues to block 414.

If the promotional program is a discount promotion, then method 400 moves onto block 414 from block 408. At block 414, the items in the basket are identified as eligible or ineligible for the promotional program. If eligible items are found at block 416, then the method 400 moves onto block 418. If no eligible items are found in the basket, then the method 400 moves onto block 426. At block 418, a payment calculation is applied to the items in the basket. The payment calculation determines the price of each of the eligible items in the basket based on any applicable promotional programs. For example, if the item is eligible for a discount, then the price of the item is calculated based on the discount. At block 420, if the promotional program is a payment program, then method 400 continues to block 422. If the promotional program is not a payment program, then method 400 moves onto block 426. At block 422, it is determined whether the funds on the promotional card covers all APL items. If the APL items are not covered by the funds, then at block 424 such items are flagged as not being funded by the swiped promotional card. After flagging the items, method 400 continues to block 426. If all of the APL items are covered by the funds, then method 400 skips block 424 and moves onto block 426. At block 426, the basket information is updated with the items' prices.

Figure 5:
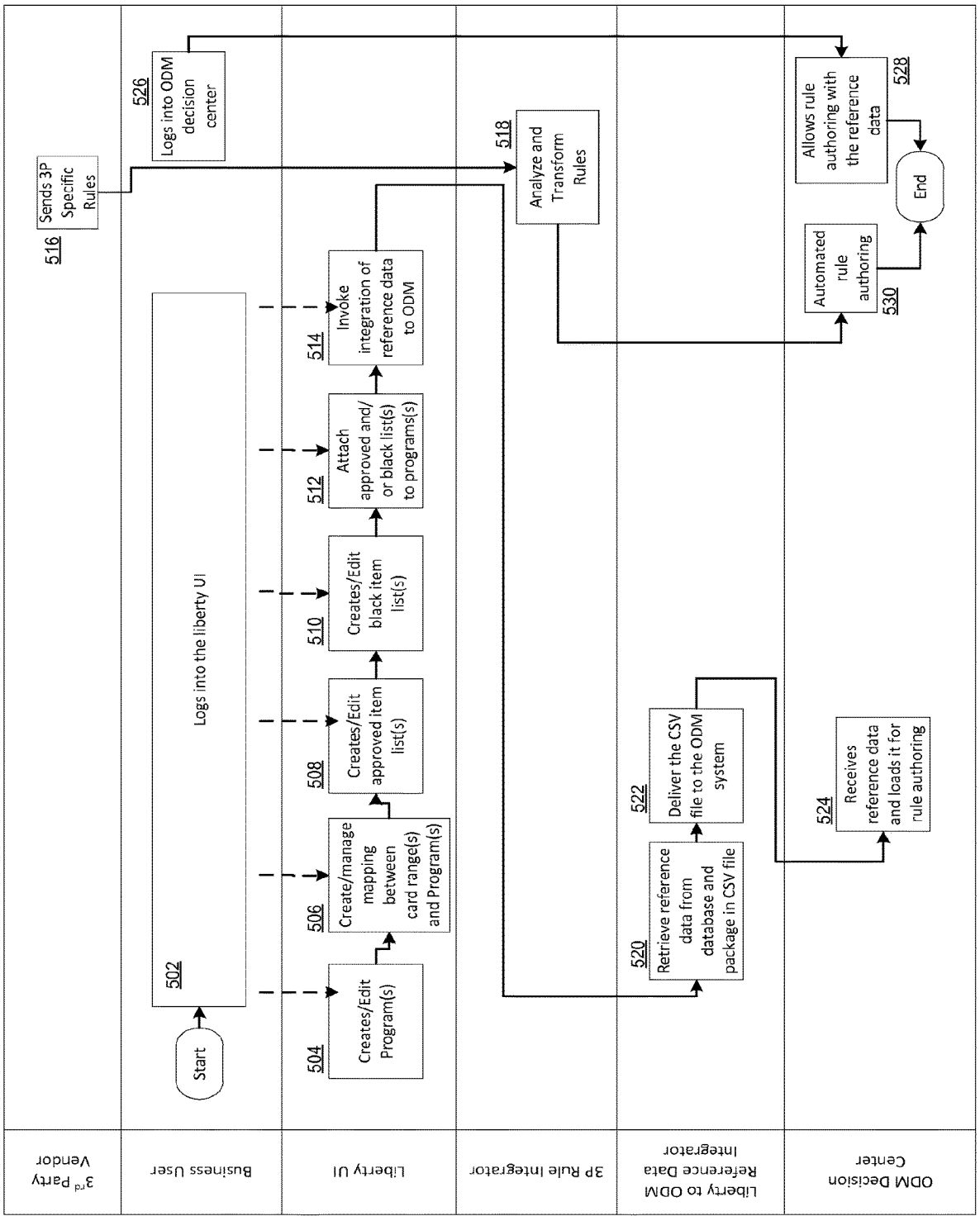
FIG. 5 is a flowchart for implementing a promotional program, according to an example embodiment.

To implement various promotional programs, an entity or business user wishing to implement a promotional program can log into the substantiation platform, and provide the rules and criteria corresponding to the promotional program. In some embodiments, the substantiation platform is capable of automatically authoring rules into the substantiation program based on the information provided by the entity. FIG. 5 is a flowchart for a method 500 for implementing a promotional program, according to an example embodiment. The method 500 starts at block 502, where a business user logs into the Liberty service user interface to set up the substantiation (promotional) program. For example, the Liberty service generates a graphical user interface (GUI) that is accessible by a third-party entities. The GUI can be programmed to receive information from the third party entities related to one or more rules used by the Liberty service to define the promotional program. Blocks 504, 506, 508, 510, 512, and 514 are the possible actions that the business user can take. The business user can perform any one or more of these actions. At block 504, the user creates or edits a substantiation program. At block 506, the business user creates or manages the mapping between card ranges and substantiation programs. At block 508, the business user creates or edits an approved item list for the promotional program. At block 510, the business user creates or edits the list for black-list items, where black-list items are items that are specifically not eligible for the promotional program. At block 512, the business user attaches or associates the approved items list and the black-list items to the substantiation program. At block 514, the business user invokes integration of the data for the substantiation program to Operational Decision Manager (ODM) decision center. The ODM decision center may include a rule authoring and repository component (decision center) and a rule execution engine (a decision server). The rule authoring component may have a user interface that a business user can access to add and/or edit rules relating to a promotional program. The business user may be a third-party entity that is different from the entity hosting the substantiation platform. In some embodiments, the substantiation platform may be hosted and made available to others by a retailer. Once the rules are in the rule repository, the business user can deploy the rules to the rule engine via the user interface.

A third-party vendor sends third-party specific rules at block 516 to the third-party rule integrator. The third party rule integrator analyzes and transforms the rules at block 518 to integrate them into the substantiation program. The data integrator retrieves data from the database and packages it in a specific type of file format, for example a CSV file.

At block 522, the file is sent to the ODM system. The ODM system receives the file and loads it for automatic rule authoring at block 524.

At block 526, the user logs into the ODM decision center. At block 528, the ODM decision center allows rule authoring with the data. At block 530, the ODM decision center performs automated rule authoring.

Figure 6:
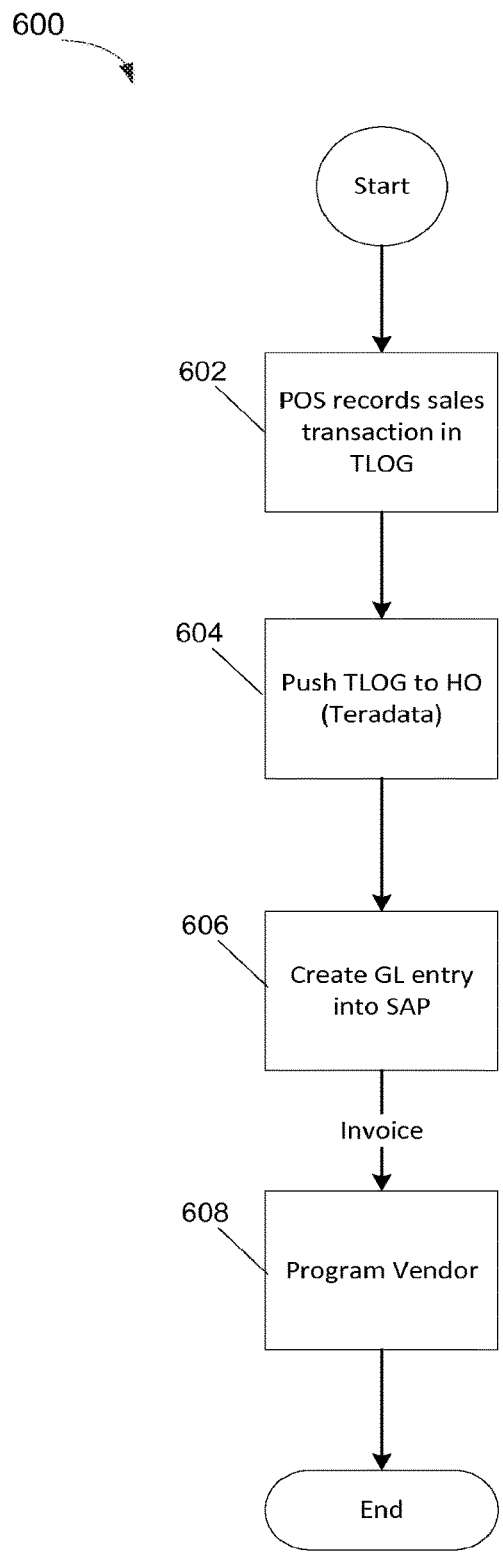
FIG. 6 is a flowchart for reconciliation with a promotional program provider, according to an example embodiment.

FIG. 6 is a flowchart for reconciliation with a promotional program provider, according to an example embodiment. The POS terminal records the sale transaction at block 602 in the system's transaction log (TLOG). At block 604, the TLOG is pushed (made available) to the 'Home Office' for processing. The Home Office may be a central office or head-office for the store that performed the sales transaction. The Home Office may be responsible for maintaining accounts for a plurality of stores in the enterprise. At block 606, a general ledger (GL) entry is created into an accounting management system, such as one provided by SAP. At block 608, the third-party vendor corresponding to the promotional program is invoiced as appropriate. In some embodiments, the third-party vendor is invoiced periodically, during certain times of the year or month. In other embodiments, the third-party vendor is invoiced as invoices are prepared.

Figure 7:
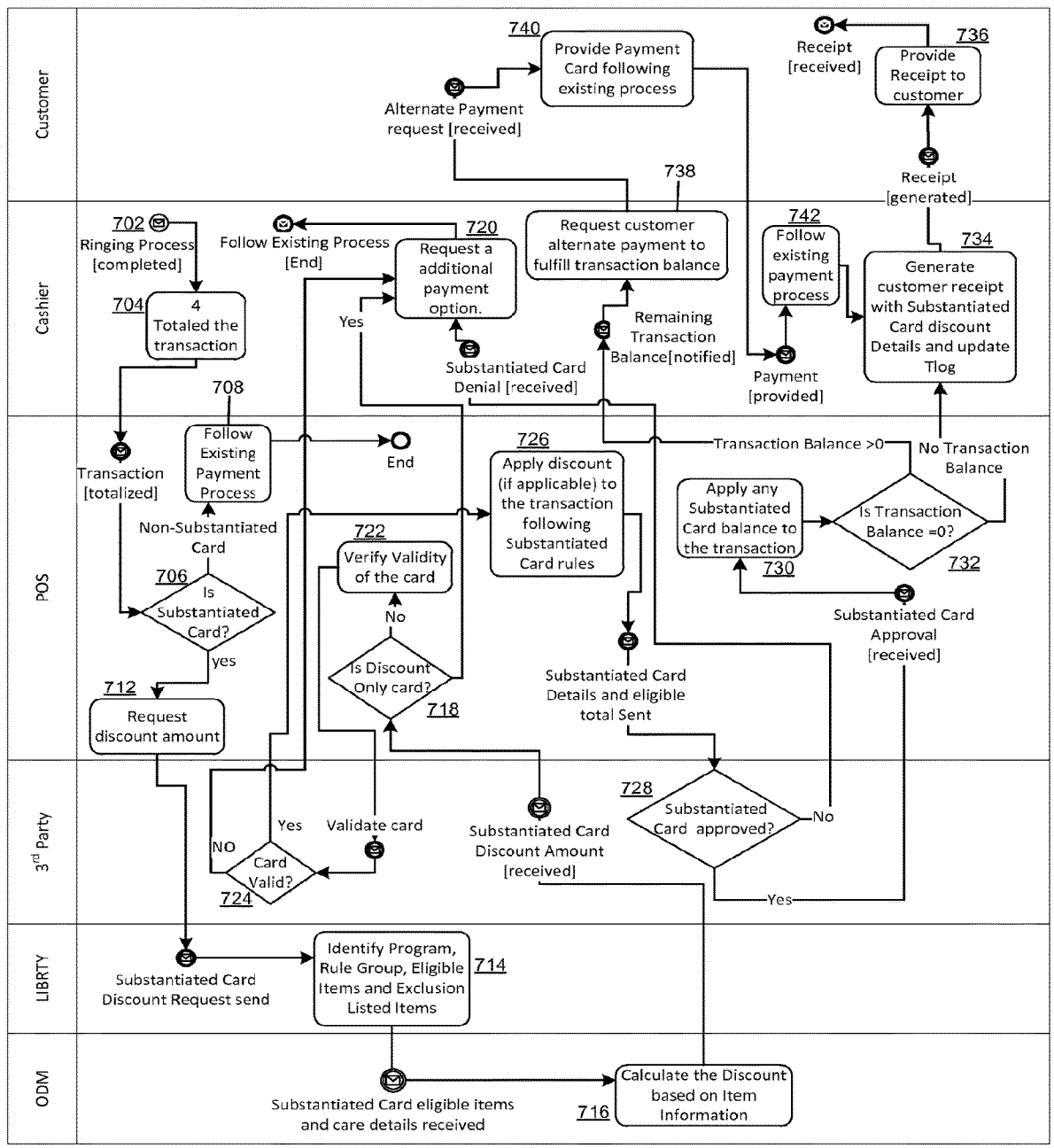
FIG. 7 is a flow diagram depicting the dataflow for a promotional program system, according to an example embodiment.

FIG. 7 is a flow diagram depicting a process 700 for a promotional program system, according to an example embodiment. In the example embodiment depicted in FIG. 7, a customer uses a promotional card that may be associated with a discount and tender promotional program. The process 700 starts when a cashier has completed the checkout process (block 702), where the cashier scans all of the items the customer wishes to purchase. A payment information or a transaction total is determined at block 704 based on the price of the scanned items. The payment information is forwarded to the POS system. The payment information may include information related to a price of the items, a total amount due for the items in the basket, a price of an item with a discount included, a total amount due with a discount and/or tender amount included, and the like. At block 706, it is determined whether a card presented by the customer during the checkout process is a promotional card. If the card is not a promotional card, then the process continues to block 708 and follows an existing payment process without applying any promotional programs.

If the card is a promotional card, then the process moves on to block 712, where a discount amount is requested. This request is communicated to the retrieval system (e.g., Liberty service system). At block 714, the promotional program associated with the promotional card is identified. Additionally, the rules associated with the promotional program, and eligible and ineligible items under the program are also identified. The identified information is communicated to ODM. At block 716, ODM calculates the discount based on the received information (e.g., promotional program rules, item information, etc.) The calculated discount is communicated to the POS system. At block 718, the POS system determines if the card is a 'discount' only card (versus a tender or a discount+tender card).

If the promotional card is a discount only card, then the process continues to block 720. At block 720, the cashier is prompted to request an additional payment option. An existing payment process is followed after an additional payment option is received.

If the promotional card is not a discount only card, then the process moves on to block 722, where the validity of the promotional card is determined. To determine the validity of the promotional card, the third-party system (e.g., a payment provider such a credit or debit card company or any other appropriate financial institution) is contacted. If the promotional card is valid then the process moves on to block 726. If the promotional card is invalid then the process moves on to block 720. At block 720, the cashier is prompted to request an additional payment option, such as another credit or debit card, cash or check, and an existing payment process is followed. If the card is valid, then at block 726 a discount is applied to the transaction total, if a discount is applicable under the promotional program rules. The promotional card information and the transaction total (with discount if applicable) is communicated to the third-party system to determine whether the promotional card is approved to tender payment (block 728). If the promotional card is not approved, then the process moves to block 720, where the cashier is promoted to request an additional form of payment for the transaction. If the card is approved, then the process continues to block 730, where the card balance, if any, is applied to the transaction. That is, any monetary funds available on the promotional card is used to pay the transaction amount in full or partially.

After the funds are applied to the transaction amount, it is determined at block 732 whether the transaction balance is zero, that is the transaction has been paid in full. If the transaction balance is zero, then the process moves on to block 734 where a customer receipt is generated, and the transaction log is updated with the information related to the transaction (e.g., discount and/or tender amount applied). At block 736, the customer is provided a receipt (via email and/or a printed copy). The receipt may include the balance of the promotional card, the transaction total with any discounts applied, a list of items purchased, and/or any other information related to the transaction.

If the transaction balance is not zero at block 732, then the process moves to block 738. At block 738, the cashier is prompted to request the customer to provide an alternate or additional form of payment to fulfill the transaction balance. After the alternate form of payment is received at block 740, an existing payment process is followed at block 742. The process moves from block 742 to block 734 where a receipt is generated for the customer (as discussed above).

In this manner, the systems and methods described herein enable creation and management of promotional programs, and enables customers to receive benefits of the promotional programs. The system assigns a promotional program (e.g., discount, incentive, tender, etc.) to a range of card numbers. These cards are provided to customers as promotional cards. A POS terminal is then programmed to accept the promotional card as tender for at least partial payment of items (e.g., products, goods, services, etc.) and/or to provide discounts or incentives on items based on rules and criteria relating to various promotional programs. To facilitate a transaction using the promotional card associated with the promotional program, at the time of checkout, the customer's card is swiped or scanned at the time of payment for the items, and the POS terminal determines whether the card is associated with a valid promotional program. If so, the POS terminal sends information about the card and the items to be purchased to a back-end processing engine (the substantiation platform), which is programmed to determine which of the items are eligible for the promotional program based on the rules associated with the program. The back-end processing engine informs the POS terminal as to which items are eligible for the promotional program and the POS terminal applies the promotional offers to only those items. The promotional programs can be defined by third parties and/or by the retailer. The third-party may be an employer of the customer or a manufacturer of an item. Some examples of the rules or criteria for a promotional program include item-based rules (e.g., specific items may be eligible, specific classes or groups of items may be eligible) and/or location-based rules (e.g., the card may only be used in specific geographical locations/regions to take advantage of the promotional program). Each card can be associated with multiple promotional programs and the system can be programmed to determine which of the promotions to apply to an item, and if multiple promotions apply to a single item, the system can be programmed to determine which of the promotions should be applied first (e.g., the system can prioritize processing of promotions).

In some embodiments, a customer can use the promotional card for online purchases also. In some embodiments, the promotional card is reloadable with other promotional offers. For example, after a customer uses the promotional card once, he or she can take it to a retailer to load it with other promotional offers. Thus, the card can be re-used, and another card number need not be generated. Some promotional programs may last over a period of time, in which case, the customer can use the promotional card multiple times over that period. For example, WalMart may have a promotional program where customers receive a discount on items purchased from the healthy produce category during the month of November. For this promotion, the customer can swipe the promotional card multiple times in November to redeem the discount for healthy produce items.

Figure 8:
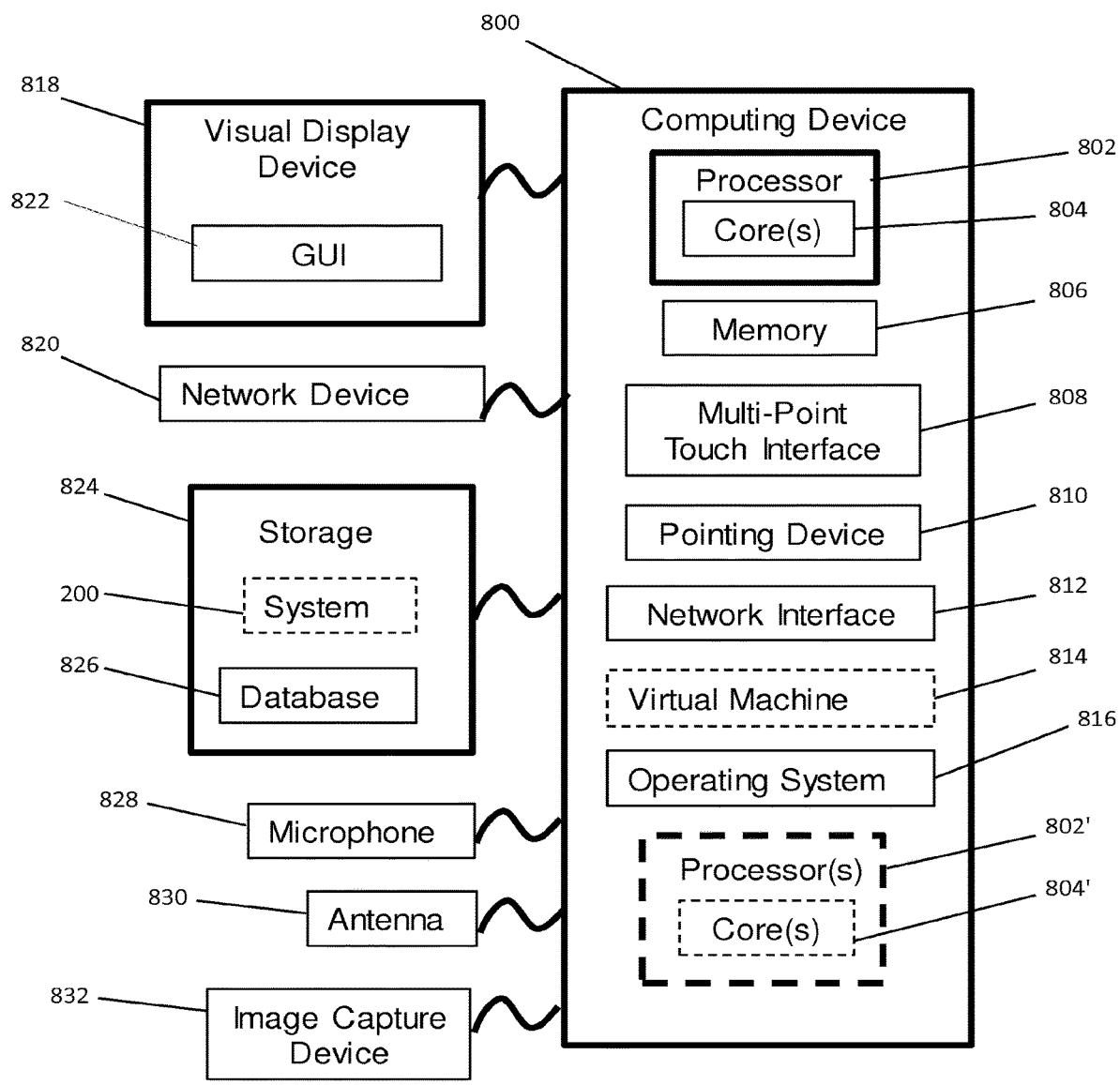
FIG. 8 is a block diagram of an exemplary computing device that may be used to implement exemplary embodiments of the promotional program system described herein.

FIG. 8 is a block diagram of an exemplary computing device 800 that may be used to implement exemplary embodiments of the promotional program system 200 described herein. The computing device 800 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 806 included in the computing device 800 may store computer-readable and computer-executable instructions or software for implementing exemplary embodiments of the promotional program system 200. The computing device 800 also includes configurable and/or programmable processor 802 and associated core 804, and optionally, one or more additional configurable and/or programmable processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' may each be a single core processor or multiple core (804 and 804') processor.

Virtualization may be employed in the computing device 800 so that infrastructure and resources in the computing device may be shared dynamically. A virtual machine 814 may be provided to handle a process running on multiple processors so that the process appears to be using only one computing resource rather than multiple computing resources. Multiple virtual machines may also be used with one processor.

Memory 806 may include a computer system memory or random access memory, such as DRAM, SRAM, EDO RAM, and the like. Memory 806 may include other types of memory as well, or combinations thereof.

A user may interact with the computing device 800 through a visual display device 818, such as a computer monitor, which may display one or more graphical user interfaces 822 that may be provided in accordance with exemplary embodiments. The computing device 800 may include other I/O devices for receiving input from a user, for example, a keyboard or any suitable multi-point touch interface 808, a pointing device 810 (e.g., a mouse), a microphone 828, and/or an image capturing device 832 (e.g., a camera or scanner). The multi-point touch interface 808 (e.g., keyboard, pin pad, scanner, touch-screen, etc.) and the pointing device 810 (e.g., mouse, stylus pen, etc.) may be coupled to the visual display device 818. The computing device 800 may include other suitable conventional I/O peripherals.

The computing device 800 may also include one or more storage devices 824, such as a hard-drive, CD-ROM, or other computer readable media, for storing data and computer-readable instructions and/or software that implement exemplary embodiments of the promotional program system 200 described herein. Exemplary storage device 824 may also store one or more databases for storing any suitable information required to implement exemplary embodiments. For example, exemplary storage device 824 can store one or more databases 826 for storing information, such as promotion card numbers, rules and criteria for promotional programs, and/or any other information to be used by embodiments of the system 200. The databases may be updated manually or automatically at any suitable time to add, delete, and/or update one or more items in the databases.

The computing device 800 can include a network interface 812 configured to interface via one or more network devices 820 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 800 can include one or more antennas 830 to facilitate wireless communication (e.g., via the network interface) between the computing device 800 and a network. The network interface 812 may include a built-in network adapter, network interface card, PCMCIA network card, card bus network adapter, wireless network adapter, USB network adapter, modem or any other device suitable for interfacing the computing device 800 to any type of network capable of communication and performing the operations described herein. Moreover, the computing device 800 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 800 may run any operating system 816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 816 may be run in native mode or emulated mode. In an exemplary embodiment, the operating system 816 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for managing promotional programs, the system comprising:
    a device programmed to receive information on one or more items to purchase in a transaction; and
    a server executing a substantiation platform programmed to communicate with the device to receive the information on the one or more items to purchase, the substantiation platform comprising a rule engine, the rule engine receives information relating to the one or more items and rules associated with a plurality of promotional programs, and analyzes the rules to determine eligibility of the one or more items for the plurality of promotional programs, and outputs payment information for the one or more items based on eligibility and the rules associated with the plurality of promotional programs, wherein the rules associated with at least one promotional program in the plurality of promotional programs defines an order of redemption when multiple promotional programs of the plurality of promotional programs are applicable for the one or more items;
    the substantiation platform receives edits to the rules integrating a modified approved items list that are specifically eligible for a promotional program and a modified black-list items list that are specifically ineligible for the promotional program of the plurality of promotional programs applicable to the one or more items, automatically generates edited rules integrating the modified approved items list and the modified black-list items list into one or more edited rules, reanalyzes the one or more edited rules to determine eligibility of the one or more items for the plurality of promotional programs based on the edited rules associated with the promotional program, and determines payment information for the one or more items determined to be eligible for the plurality of promotional programs; and
    wherein the transaction for the purchase of the one or more items includes a first transaction for a payment amount determined based on the payment information for the one or more items determined to be eligible and a second transaction for one or more ineligible items using different payment information.

2. The system of claim 1, wherein at least one of the plurality of promotional programs is an offer for a discount for a purchase of one or more items.

3. The system of claim 1, wherein at least one of the plurality of promotional programs is an offer for a tender amount wherein the tender amount can be used to make a payment for the one or more items.

4. The system of claim 1, wherein the rules associated the promotional program defines one or more eligible items for the at least one of the plurality of promotional programs, one or more discounts, one or more tender amounts, or one or more locations where the at least one of the plurality of promotional programs is eligible.

5. The system of claim 1, wherein the device comprises a cash register, a computer, a portable device, or a smart phone.

6. The system of claim 1, wherein the substantiation platform is further configured to receive input from a user, wherein the input defines the one or more rules associated with the plurality of promotional programs.

7. The system of claim 1, wherein the substantiation platform is programmed to determine whether the one or more items is eligible for the plurality of promotional programs based on whether the one or more items are associated with the modified approved items list or to determine whether the one or more items are eligible based on whether the one or more items are excluded from the modified black-list items list.

8. The system of claim 1, wherein the device is further configured to receive a promotional card for the transaction, and the substantiation platform determines the plurality of promotional programs based on promotional programs associated with the promotional card.

9. The system of claim 8, wherein the payment information identifies which of the one or more items are eligible for the plurality of promotional programs, and the device accepts the promotional card as tender for any of the one or more items identified as being eligible and denies the promotional card as tender for any of the one or more items identified as being ineligible.

10. The system of claim 1, wherein the substantiation platform is further configured to generate a user interface, wherein the user interface receives information related to the one or more rules for at least one of the plurality of promotional programs.

11. A method for managing promotional programs, the method comprising:
    Receiving, by a server executing a substantiation platform, information related to one or more items for purchase in a transaction from a device;
    determining, by execution of a rules engine of the substantiation platform, eligibility of the one or more items for a plurality of promotional programs based on one or more rules associated with at least one promotional program of the plurality of promotional programs, and determining eligibility of items based on rules defining redemption order of multiple promotional programs;

receiving, by the substantiation platform, edits to the rules integrating a modified approved items list that are specifically eligible for a promotional program and a modified black-list items list that are specifically ineligible for the promotional program of the plurality of promotional programs applicable to the one or more items;

automatically generating, by the substantiation platform, edited rules integrating the modified approved items list and the modified black-list items list into one or more edited rules;

reanalyzing, by the substantiation platform the one or more edited rules to determine eligibility of the one or more items for the plurality of promotional programs based on the one or more edited rules associated with the promotional program;

determining, in response to execution of the rules engine, payment information for the one or more items based on the eligibility of the one or more items and the one or more rules for the plurality of promotional programs;

wherein the transaction for the purchase of the one or more items includes a first transaction for a payment amount determined based on the payment information for the one or more items determined to be eligible and a second transaction for one or more ineligible items using different payment information.

12. The method of claim 11, further comprising:
receiving information related to the one or more rules associated with the plurality of promotional programs;
defining the plurality of promotional programs based on the received information; and
associating the plurality of promotional programs with a promotional card.

13. The method of claim 11, wherein the device is further configured to receive a promotional card for the transaction, and the substantiation platform determines the plurality of promotional programs based on promotional programs associated with the promotional card.

14. The method of claim 13, further comprising associating the promotional program with a range of card numbers and/or bank identification numbers (BINs) corresponding to a plurality of promotional cards.

15. The method of claim 13, further comprising associating another promotional program with the promotional card.

16. The method of claim 11, further comprising accepting payment based on the payment information.

17. The method of claim 11, wherein the device comprises a cash register, a computer, a portable device, or a smart phone.

18. The method of claim 11, wherein the rules associated with the at least one promotional program defines one or more eligible items for the plurality of promotional programs, one or more discounts, one or more tender amounts, or one or more locations where the plurality of promotional programs is eligible.

19. The method of claim 11, wherein the plurality of promotional programs is defined by a retail store for items purchased at the retail store.

20. The method of claim 11, wherein the plurality of promotional programs is defined by a third-party entity for items purchased at a retail store, wherein the third-party entity and the retail store are unrelated.

21. The method of claim 20, further comprising communicating with the third-party entity for reconciliation of accounts based on the plurality of promotional programs.

22. The method of claim 11, further comprising generating a user interface accessible by a user, wherein the user interface is configured to receive information related to the one or more rules used to define the plurality of promotional programs.

23. A non-transitory computer readable medium storing instructions executable by a processing device, wherein execution of the instructions causes the processing device to implement a method for managing a plurality of promotional programs, the method comprising:
receiving, by a server executing a substantiation platform, information related to one or more items to purchase in a transaction from a device;
determining, by execution of a rules engine of the substantiation platform, eligibility of the one or more items for the plurality of promotional programs based on one or more rules associated with at least one of the plurality of promotional programs, wherein the substantiation platform determines eligibility of items based on rules defining redemption order of multiple promotional programs;
receiving, by the substantiation platform, edits to the rules integrating a modified approved items list that are specifically eligible for a promotional program and a modified black-list items list that are specifically ineligible for the promotional program associated with at least one of the plurality of promotional programs applicable to the one or more items;
automatically generating, by the substantiation platform, edited rules integrating the modified approved items list and the modified black-list items list into one or more edited rules;
reanalyzing, by the substantiation platform the one or more edited rules to determine eligibility of the one or more items for the plurality of promotional programs based on the one or more edited rules associated with at least one of the plurality of promotional programs;
determining, in response to execution of the rules engine, payment information for the one or more items based on the eligibility of the one or more items and the one or more rules for the plurality of promotional programs;
wherein the transaction for the purchase of the one or more items includes a first transaction for a payment amount determined based on the payment information for the one or more items determined to be eligible and a second transaction for one or more ineligible items using different payment information.

24. The non-transitory computer readable medium of claim 23, further comprising:
receiving information related to the one or more rules associated with the plurality of promotional programs;
defining the plurality of promotional programs based on the received information; and
associating the plurality of promotional programs with at least one promotional card.

25. The non-transitory computer readable medium of claim 23, wherein the rules associated with the at least one of the plurality of promotional programs defines one or more eligible items for the plurality of promotional programs, one or more discounts, one or more tender amounts, or one or more locations where the plurality of promotional programs is eligible.

26. The non-transitory computer readable medium of claim 23, wherein the device comprises a cash register, a computer, a portable device, or a smart phone.

27. The non-transitory computer readable medium of claim 23, further comprising generating a user interface accessible by a user, wherein the user interface is configured to receive information related to the one or more rules used to define at least one of the plurality of promotional programs.

* * * * *